Aug. 27, 1929.  R. FRIEDL  1,726,217
EXHAUST VALVE COOLING SYSTEM FOR INTERNAL COMBUSTION ENGINES
Filed Aug. 30, 1927
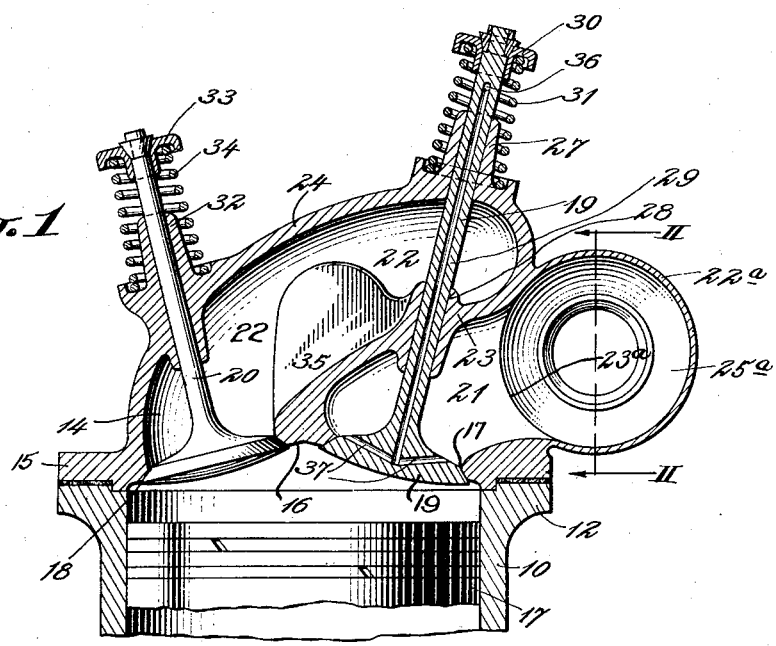
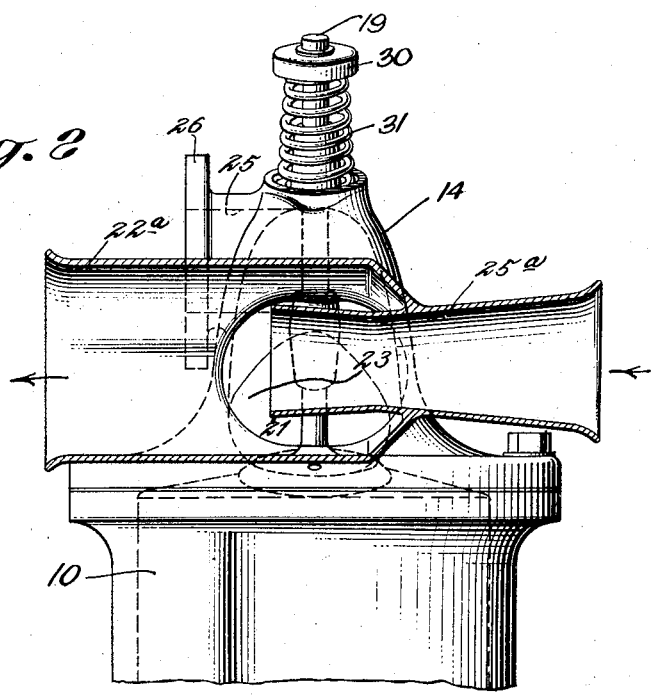
INVENTOR.
Ralph Friedl
BY Townsend, Loftus & Abbett
ATTORNEYS.

Patented Aug. 27, 1929.

1,726,217

UNITED STATES PATENT OFFICE.

RALPH FRIEDL, OF ALAMEDA, CALIFORNIA.

EXHAUST-VALVE-COOLING SYSTEM FOR INTERNAL-COMBUSTION ENGINES.

Application filed August 30, 1927. Serial No. 216,362.

This invention relates to internal combustion engines and particularly pertains to a cylinder head construction for aeroplane engines of the radial type.

It is the principal object of the present invention to increase the efficiency and improve the operation of internal combustion motors of the type referred to by the provision of means for maintaining the exhaust valve and its stem cool, which means includes subjecting the surfaces of the exhaust valve and its stem to the cooling action of an air current and causing the air current to expand adjacent the surfaces of the valve and valve stem to create a cooling action on the stem and valve.

In carrying the invention into practice I provide a cylinder head for an internal combustion motor cylinder wherein the exhaust valve stem extends through the intake chamber so that the gases drawn in from the intake manifold will pass around the valve stem resulting in an exchange of heat. This heat exchange pre-heats the indrawn gases and maintains the valve stem cool. To aid in cooling the valve stem I have provided means for creating a circulation of air through the exhaust valve and a vacuum in the exhaust chamber which acts to keep the exhaust valve cool and to aid in thoroughly scavenging the cylinder.

One form which the invention may assume is exemplified in the following description and illustrated by way of example in the accompanying drawings in which:

Figure 1 is a central vertical section through a cylinder head embodying the preferred form of my invention.

Figure 2 is a view in section taken on line 2—2 of Fig. 1.

Referring more particularly to the accompanying drawings, 10 indicates cylinder of an internal combustion engine of the type used in aeroplanes. The embodiment of the invention shown in the accompanying drawings is for motors wherein the cylinders are disposed radially to a central point and exposed to the elements at the front of the fuselage of the plane. In this type of engine each cylinder has a separate cylinder head the intake ports of which are connected together by a manifold.

In the present instance the cylinder is indicated by the numeral 10 and is illustrated as having a surrounding flange 12 at its end. A cylinder head 14 is formed with a flange 15 complementary to the flange 12 so that the cylinder head may be securely bolted or otherwise secured to the cylinder 10. This manner of connecting the cylinder head to the cylinder permits the head to be easily and quickly removed for the purpose of making adjustments or repairs.

Reference being had to Fig. 1 will be seen that at its bottom the cylinder head 14 is formed with a concaved well 16 which acts to enclose the end of the cylinder when the head is fitted thereto. This formation of the bottom wall 16 of the cylinder head forms a conical shaped combustion chamber within the cylinder when the piston in the cylinder reaches the outer end of its stroke.

Formed in the wall 16 of the cylinder head is an exhaust port 17 and an intake port 18. These ports are located upon opposite sides of the center of the cylinder and are each surrounded by a conventional form of valve seat. Cooperating with these valve seats at the exhaust and intake ports are an exhaust valve 19 and an intake valve 20.

Communicating with the exhaust port is an exhaust chamber 21 and communicating with the intake port 18 is an intake chamber 22. Both of these chambers are disposed at an angle to the central axis of the cylinder. A central wall 23 separates the intake chamber from the exhaust chamber. It will be noted that this central wall 23 commences from the center of the cylinder head at the wall 16 and extends at an angle to the axis of the cylinder so that the intake chamber 22 will overlie the exhaust chamber and the exhaust port 17. The other wall of the intake chamber or that indicated by numeral 24, is the outer wall of the cylinder head. At its upper end the intake chamber is formed with a tubular section 25 which is formed with a flange 26 so that the intake chamber may be connected with any suitable intake manifold.

Arranged contiguous to the exhaust port 21 is an open ended barrel 22ª. A circular port 23ª is provided to establish communication between the interior of the barrel 22ª and the exhaust chamber 21. At one end the barrel 22ª is tapered and a Venturi tube 25ª is secured coaxially therein. The larger end of the Venturi tube extends forwardly of the engine so that when the motor is in operation driving a plane, a considerable draft of air will be forced through the Venturi tube and out through the other open end of the barrel 22ª.

It is obvious that when the plane is in motion a considerable draft will result through the Venturi tube 25ª and the barrel 22ª creating a partial vacuum in the exhaust chamber 21. The vacuum created by this suction is desirable for several reasons, one being to assist in completely scavenging the combustion chamber when the exhaust valve is open and another being to maintain the exhaust valve at an even cool temperature.

It will be noticed from Fig. 1 that the wall 23 dividing the intake chamber 22 from the exhaust chamber 21 and the outer wall 24 are formed with aligned valve guides 27 and 28 in which the valve stem 29 of the exhaust valve 19 reciprocates. The outer end of the valve stem 29 of the exhaust valve is fitted with the usual retaining cup 30 between which and the wall 24 a valve spring 31 is interposed.

To guide the intake valve a valve guide 32 is formed on the wall 24 and through which the stem of the intake valve is guided. The intake valve is also fitted with the usual retainer cup 33 and valve spring 34.

It should be stated that as the means for operating the valves forms no part of the present invention it is not here shown, it being sufficient to state that these valves are operated in synchronism with the piston as in the ordinary type of four cycle engine.

The intake and exhaust valves 19 and 20 are arranged at opposite angles relative to the central axis of the cylinder and I desire to call attention to the fact that the stem 29 of the exhaust valve projects through the intake chamber 22 at the center of the tubular portion 25 of the intake chamber so that any gases drawn in from the intake manifold must pass around the exhaust valve stem before passing to the intake port 18. This is very important as it has several beneficial effects.

When the motor is on the suction stroke with the intake valve open, a partial vacuum is created in the intake chamber 22 and cool gases are drawn into the intake chamber from the intake manifold and carburetor. These gases when passing into the intake chamber 22 will pass around the exhaust valve stem 29 and an exchange of heat will be effected. The exhaust valve stem being very hot when the engine is in operation will transfer some of its heat to the incoming cool gases, and thereby be maintained cool while the combustible gases entering the chamber 22 will be pre-heated, so that a higher efficiency in the motor will be obtained.

These gases will be further heated by passing over the lower portion of the wall 23, and cooling fins 35 which project within the intake chamber 22 from the lower portion of the wall 23. It will be seen that heat will be conducted from the wall 16 to the wall 23 and thence to the fins 35. This heat will be dissipated to a certain extent by the incoming cool gases which acts both to heat the gases to more thoroughly vaporize them, and also to maintain the cylinder head cool.

The cooling effects resulting from the construction just described will be of great benefit in the operation of the exhaust valve as the latter will be maintained at an even cool temperature and will be prevented from sticking in its guide and from warping due to being overheated.

I find in actual practice that a certain amount of fuel condensate will find its way into the valve guide 28 and keep the same and the valve stem free from carbon.

To aid in maintaining the exhaust valve cool I have provided means for creating a circulation of air through the exhaust valve. I accomplished this by forming the exhaust valve stem 29 hollow and providing ports 36 at the upper end of the valve stem and passages 37 at the lower end of the valve stem. The ports 36 in the upper end of the valve stem form means of communication between the atmosphere and the interior of the valve stem while the passages 37 formed means of communication between the interior of the valve stem and the exhaust chamber 21. As previously described a suction will be produced in the exhaust chamber 21 due to the provision of the barrel 22ª and the Venturi tube 25ª reducing the pressure in the exhaust chamber 21. Thus a suction will be created through the passage ways 37 and draw in cool air from the atmosphere through the interior of the valve stem. This passage of cool air from the valve stem and head of the valve will aid materially in maintaining the valve at a cool even temperature.

In operation of the device the cylinder head is constructed as previously described and fitted to the end of the cylinder. The intake chamber 22 is then connected with the intake manifold and valve operating mechanism is operatively associated with the intake and exhaust valves so as to operate them in syncronism with the strokes of the piston. When the motor is placed in operation the cool incoming gases will pass around the exhaust valve stem 29 and over the fins 35 and will be injected into the cylinder in a pre-heated condition which makes for perfect combustion. An exchange of heat will be effected during the passage of gases into the cylinder which will cool the exhaust valve stem and cylinder head walls. It should be pointed out here that it will be impossible under the present arrangement for raw fuel to enter the cylinder due to the fact that the fuel must pass over several heated surfaces before gaining entrance to the cylinder through the intake port.

When the motor is placed in operation the Venturi tube being directly behind the propeller of the plane and therefore in its blast, will create a suction in the exhaust chamber 21. This suction will be still more intensified by the blast of air passing through the Venturi tube due to the forward motion of the plane.

I desire to call attention to the fact that the ports 36 in the upper end of the exhaust valve stem are less in area than the area of the passage way through the valve stem therefore the air will be drawn through the valve stem and through the exhaust chamber 21 at a pressure less than atmospheric. I consider this to be quite an important feature inasmuch as by this arrangement I utilize not only the value of the air circulating through the exhaust valve stem but also the refrigeration value obtained by the air draft passing through the valve stem and exhaust chamber at less than atmospheric pressure and expanding therein.

It will be noted from the drawings that the entire face of the valve head, the valve stem, and the walls of the exhaust chamber 21, and also the exhaust valve guide will be subjected to the cooling action of the air drawn therethrough at less than atmospheric pressure. This will materially aid in maintaining the valve and the walls of the exhaust chamber cool.

Likewise this draft will aid in quickly and thoroughly scavenging the combustion chamber when the motor is on the exhaust stroke.

I also desire to point out that due to its simple construction the cylinder head here disclosed may be expeditiously removed so that adjustment and repairs may be made to the valves and valve seats enabling the ordinary aviator to correct any faulty valve action.

From the foregoing it is obvious that I have provided a cylinder head construction for aeroplane engines wherein the combustible mixtures will be thoroughly heated prior to their entrance to the combustion chamber. Also, I have so arranged and constructed the elements of the head that the exhaust valve will be maintained cool so as to eliminate any possibility of its warping or sticking due to becoming overheated. Further, I have provided means while aiding and maintaining the exhaust cool, also to aid in completely scavenging the combustion chamber on the exhaust stroke of the motor.

While I have shown the preferred form of my invention it is to be understood that various changes may be made in the construction and formation of the various parts without departure from the spirit of the invention as defined in appended claims.

Having thus described my invention, what I claim and desire to secure by Letters Patent is:

1. A method of cooling a valve and its stem in an internal combustion engine, which comprises reducing the air pressure contiguous to the surfaces of the valve and its stem to below atmospheric pressure and causing a constant air flow from the atmosphere through said reduced pressure areas.

2. A method of cooling the hollow stem of an internal combustion engine exhaust valve, which comprises reducing the air pressure within the stem to below atmospheric pressure and causing a constant flow of air to pass through the stem from the atmosphere.

3. In an internal combustion engine having an exhaust valve and stem, said stem being hollow, means for reducing the pressure within and surrounding the stem to below atmospheric pressure, and means cooperating with the first means for creating a constant flow of air through the stem from the atmosphere.

4. In an internal combustion engine having an exhaust valve and stem, said stem being hollow, means for reducing the pressure within and surrounding the stem and about the surfaces of the valve head to below atmospheric pressure, and means cooperating with the first named means for creating a constant flow of air through the stem over said surfaces from the atmosphere.

RALPH FRIEDL.